United States Patent Office 2,890,967
Patented June 16, 1959

2,890,967

ASPHALT COATING

Arnold J. Hoiberg and Charles E. Cowger, El Dorado, Ark., assignors to Monsanto Chemical Company, St. Louis, Mo., a corporation of Delaware No Drawing. Application February 10, 1956
Serial No. 564,623

4 Claims. (Cl. 106—278)

This invention relates to an asphalt coating composition, and more particularly to a cutback asphalt breathing type of weatherproof coating particularly adapted for use over high temperature insulation, walls and the like.

When ordinary cutback types of mineral-filled asphalt coating are applied on high temperature insulation, masonry. Portland cement concrete, and other materials which contain voids filled with water or other vapor or gas, blisters are likely to form on the surface of the coating upon subsequent heating of the coated object as when used as insulation, or by the sun's rays. Blistering may be especially bad when liquid water is present in the voids. The degree and amount of blistering depend somewhat on the rate and amount of vapor formation and on the ease of escape of the vapor by paths other than through deformation of the coating. This type of coating is highly impervious and thus very effective in preventing water from entering the coating, however any water or vapor which is present within or enters the porous wall structure, or insulation, likewise is unable to escape except by deformation of the coating.

It is known that blistering may be avoided by employing an asphalt emulsion type of coating, i.e. a coating formed from water, asphalt, asbestos fiber and with or without other mineral fillers. Such a coating is known as a breathing type of coating. That is, the coating is porous and permeable to water vapor, thus permitting water vapor to escape through the coating without causing blistering or deformation of the coating. However, asphalt emulsion coatings provide an inadequate seal or weatherproof coating for liquid water. Furthermore, they permit wicking, a phenomenon by which liquid water and water solutions of salts are transported outwardly to the surface of the coating to cause unsightly staining. In addition, such coatings have very high shrinkage.

Protective films prepared from our improved coating composition show vapor transmission rates about thirteen times greater than films prepared from the ordinary cutback mastic type. The emulsion type coatings, while showing high vapor transmission rates, also allow liquid water to be wicked therethrough, and of more serious importance, permit salts from the underlying refractory cement to be wicked outwardly. Coating films prepared from our composition show greater stiffness and resistance to deformation at elevated temperatures than either the emulsion coatings, or ordinary cutback mastic types. The movement of moisture outwardly from beneath our coating is by diffusion only, thus water soluble salts are not wicked to the outer surface of the coating to cause staining.

In our coating composition the fiber and mineral filler components are each intimately coated and impregnated with the asphaltic base and thereby wicking through the medium of the filler is prevented. In the emulsion type of coating the fiber and mineral filler components are not completely coated with asphalt base because of the water employed therein, and thus wicking can occur. While wicking is not too serious a problem in the case of the cutback asphalt mastic type coating referred to, such material, as indicated, forms almost a perfect vapor barrier, and consequently blisters badly where it is used in connection with high temperature installations.

It is an object of this invention to provide an improved cutback asphalt coating which does not blister, and which possesses improved stiffness at elevated temperatures.

Another object of this invention is to provide a "breathing" type coating which does not wick, and yet provides an adequate seal for liquid water.

A further object of the invention is to provide a coating possessed of comparatively low shrinkage. Further objects will be apparent from the description of the invention which follows.

We are aware that air blown as well as cutback asphalts have been previously employed for coating purposes, with and without such mineral fillers as asbestos, slate and the like. As we have previously indicated, these prior art coating materials have found wide application and acceptance, but their deficiencies have also been apparent.

Asphalts, either natural or petroleum derived, have been used for many years and yet very little is known of their chemical structure. The study of asphalts is complicated by its complex structure and the fact that individual asphalts vary widely in their physical and chemical make-up. With higher boiling points and increases in molecular weight, a staggering number of isomers can occur, and it is impossible to do more than break these down into groups. Asphalt comprises one such broad group in fractionating asphalt base petroleum stocks. The asphalts in turn may be broken down into asphaltenes, resins, oils and wax fractions. While the presence of the latter fractions may be readily determined, such knowledge is insufficient to provide insight and understanding of the physical behavior of the asphaltic material.

Research on the composition of asphalt has demonstrated that its nature is variably colloidal. The asphaltene fraction, having the highest molecular weight, is the disperse phase, and the resins are considered the dispersing medium, with the oils and content of wax which they can dissolve being the continuous phase. Both from the colloidal and solubility aspects, it is apparent that in addition to the importance of the quantity of each fraction in determining the degree of dispersion and behavior of the asphalt, the character of each fraction is very important.

While the desirability of having a knowledge of the above factors in producing protective asphaltic coatings is well recognized, asphalt technology has not progressed to an extent permitting the exact determination of these factors, and the very best that can be done in defining the properties to be possessed by the asphalt base stock and the finished material is by empirical physical properties such as softening point, penetration, viscosities, boiling point, etc. Only by considering such properties as an entity can the possible service behavior of the finished product be characterized.

In accordance with the present invention we have discovered that a highly superior protective coating composition may be prepared from asphalt base crude oils particularly adapted for use under high temperature conditions where transmission of moisture in the form of vapor but not liquid is of importance.

We have found that the objects of the invention are accomplished by reducing an asphalt base crude oil to an asphaltic residue in a steam and vacuum unit. For Arkansas crudes, the asphalt residue is reduced to a penetration within the range of about 85–225 mm./10 at 77° F. This value will vary depending upon crude source, and is not critical within broad limits. The penetration range after air-blowing the asphaltic residue is of much greater criticality.

The asphalt residue is air-blown until the material shows a penetration of about 10–30 mm./10 at 77° F. and a softening point (R. & B.) of about 150°–250° F. The air-blown asphalt should also have a penetration value less than 225° mm./10 at 150° F. (50 g., 5 secs.) and not exceed this penetration value at the maximum cured film temperature to which the finished composition is likely to be subjected. For low temperature flexibility, the blown asphalt should also exhibit a penetration value of not less than 8 mm./10 at 32° F. (200 g., 60 secs.).

The air-blown asphalt is cut back with mineral spirits to a degree depending upon the curing rate desired for the composition. Generally 40% to 60% by volume of the cutback solvent is satisfactory in the case of mineral spirits. The preferred cutback solvent comprises 306–360° F. boiling range mineral spirits. A wide variation in solvents may be used however, ranging from rubber solvent naphtha and mineral spirits boiling up to about 450° F. A 50/50 blend of 306–360° F. and 240–215° F. boiling range material has also been successfully employed. The solvent should have good solvency for the asphalt base and generally be non-corrosive and free from offensive odor.

Depending upon the solvent employed, the resulting cutback asphalt should have a viscosity in the broad range of about 35–100 seconds (Saybolt Furol) at 77° F., depending upon crude source, and a weight of about 7–8 pounds per gallon at 60° F. We prefer, however, a viscosity in the range of 40–60 seconds (S.F.) at 77° F. for asphalt derived from Arkansas crudes.

To the cutback vehicle there is added about 14% to 18% by weight asbestos fiber from the group classified as 7M or 7T grade under the Canadian Crysolite Asbestos Classification, depending upon whether a spray or trowel grade composition is being prepared. A mixture of 7M and 7T grade may be employed, or the asbestos may be comprised solely of one or the other grade. The asbestos fiber is graded on a Quebec Standard Asbestos Testing machine comprising a series of superimposed boxes having screens with varying meshes. (See Canadian Department of Mines Bulletin #707 (1931). U.S. Bureau of Mines Bulletin 403 on asbestos (1937).) After adding the asbestos fiber, about 6–9% by weight of exfoliated or expanded vermiculite is added of a size such that at least 90% is retained on a 100 mesh screen. The order of adding the mineral filler is not critical, although we prefer to add the asbestos first since the vermiculite particle size might be reduced by over mixing if the latter material is added first.

The examples which follow illustrate in more detail the manner of preparing our improved coating composition. They are not to be construed, however, as defining the scope of the invention.

EXAMPLE 1

Smackover crude oil from the Smackover Field, Arkansas, was reduced in a steam and vacuum distillation unit to a penetration at 77° F., 100 grams, of 85–100 mm./10. This asphaltic residue was then air-blown to have a penetration at 77° F., 100 g., 5 secs. of 18–22 mm./10; at 150° F., 50 g., 5 secs. of 200–225 mm./10; at 32° F., 200 g., 60 secs. of 8–11 mm./10; and a softening point (R. & B.) of 170–175° F. The air-blown asphalt was cut back with mineral spirits in the proportion of 45 parts asphalt to 55 parts spirits by volume.

The mineral spirits employed was a 50/50 blend of 306–360° F. and 240–215° F. boiling range material.

The resulting cutback asphalt had a viscosity in the range of 40–50 seconds (Saybolt Furol) at 77° F., and a weight of approximately 7.34 pounds per gallon at 60° F. Vermiculite and asbestos fillers were then added to the cutback asphalt in the following amounts wherein parts are by weight:

| | Parts |
|---|---|
| Cutback asphalt | 77.5 |
| Expanded vermiculite | 7.5 |
| 7M grade asbestos | 15.0 |

The expanded vermiculite had the following U.S. screen analysis:

| | |
|---|---|
| Retained No. 8 | Trace |
| Retained No. 30 | 25% |
| Retained No. 50 | 70% |
| Retained No. 100 | 97% |
| Density, approximately | 13 lbs./cu. ft. |

The asbestos designation, 7M is described under the Canadian Crysolite Asbestos Classification with a minimum test of 0.0–0.0–1.0–15.0 on the four standard boxes.

The above formulation was sprayable with mastic type of equipment and could be applied readily to a ⅛ inch film thickness without the film flowing. The cured film had a composition by volume approximately as follows.

| | Percent |
|---|---|
| Asphalt | 55 |
| Vermiculite | 36 |
| Asbestos | 9 |

EXAMPLE II

Crude oil from the Shuler Field in South Arkansas, was reduced in a steam and vacuum distillation unit to an asphalt residue having a penetration at 77° F. of 150–200 mm./10 (100 g., 5 secs.). This residue was then air-blown to have a softening point (R. & B.) of 210° F.; a penetration at 77° F. of 15 mm./10; at 150° F., 50 g., 5 sec. of 150 mm./10; and at 32° F., 200 g., 60 sec. of 10 mm./10. The air-blown asphalt was blended with mineral spirits in the proportion of 43% by volume blown asphalt base and 57% by volume of 306–360° F. boiling range mineral spirits. The blended or cutback vehicle had a viscosity of 55 seconds Saybolt Furol at 77° F. and a weight of 7.30 pounds per gallon at 60° F. To the cutback vehicle there was added 8% by weight of 7M grade asbestos fibers, and 8% by weight 7T grade asbestos fibers. After the asbestos fibers were mixed into the asphalt, 7% by weight of expanded vermiculite was added of a size such that 0% was retained on a #4 screen, a trace retained on a #8 screen, with 97% being retained on a #100 screen. The resulting composition was comprised of 77% by weight cutback asphalt vehicle.

The asbestos designation "7M grade" has been described in Example I. The 7T grade asbestos has the following typical screen analysis: 0.6% retained on a 14 mesh screen, 44.9% retained on a 48 mesh screen, 11.0% retained on a 100 mesh screen, 9.5% retained on a 200 mesh screen, and 34.0% passing through a 200 mesh screen. The 7M and 7T grades comprise what is known in the trade as "short" asbestos fibers.

As previously indicated, our composition may be applied in a number of different ways to provide a weather barrier for insulation or masonry, and other surfaces generally. Typical preferred finished compositions, prepared as heretofore described, for spray and trowel application are as follows:

| Coating Composition | Spray grade, Percent by weight | Trowel grade, Percent by weight |
|---|---|---|
| Blown asphalt base | 41.0 | 42.5 |
| Cutback solvent | 36.5 | 32.0 |
| Vermiculite | 7.5 | 8.5 |
| Asbestos | 15.0 | 17.0 |
| | 100.0 | 100.0 |

The above preferred spray grade composition of the present invention is characterized by a flash point of above 100° F. (Pensky Martens Closed Cup); a viscosity of 200–400 secs. (Stormer, ASTM test D562); a cone penetration (@ 77° F., mm./10) of 340–370. A ⅛ inch film of the sprayed composition should be dry to the touch in less than 30 minutes.

The above described trowel grade composition possesses substantially the same physical properties as the spray grade. The trowel grade material, due to the difference in consistency has a cone penetration (@ 77° F., mm./10) of 250–270. It should be emphasized, however, that the properties of the final cured film are the same regardless of the method of application.

The composition, whether spray or trowel grade, in its uncured state, i.e. in a form suitable for application, is comprised broadly of from 40% to 60% by weight of the air-blown asphalt, from 30% to 40% by weight solvent, from 7% to 9% by weight vermiculite and from 13% to 21% by weight of asbestos fiber.

Cured films of our coating composition have sufficient permeability and stiffness so as to show no blistering over moist or wet insulation around a steam pipe. The vapor transmission rate of a ⅛ inch film of a cutback asphalt mastic is about 0.01 to 0.02 g. per 100 sq. inches per 24 hours. In contrast, the rate of vapor transmission of a cured film of our composition is about 0.1 to 0.3 gm. under the same conditions. (ASTM test C-214, wet cup, at 100° F. 100 sq. inches/24 hours, 0–50% relative humidity.) Our composition is therefore about thirteen times more permeable to water vapor.

To demonstrate relative absence of wicking and resistance to blister formation with films of improved composition, tests were conducted as follows using a film prepared from the composition of the present invention, described as Test 1, and a film prepared from cutback mastic type compositions, described as Test 2, and an asphalt emulsion type, described as Test 3.

*Test No. 1*

A two-foot length of four inch pipe with connection for introducing steam at the bottom, and with an outlet line with valve control coming off overhead, was covered with ordinary steam pipe refractory cement insulation material. A thermometer was inserted into a T mounted on the outlet and immersed 6 to 8 inches into the steam pipe. The refractory cement insulation was wet thoroughly by holding it under running water for about 2 minutes. The wet insulation surrounding the test pipe was coated with a ⅛ inch film of our improved coating composition, and the entire assembly was placed outdoors to cure overnight. On the following day the assembly was connected to a steam line and the steam adjusted until an inside temperature of 250–260° F. was reached. This temperature was held for 2½ hours the first day, and 8½ hours for the next succeeding 3 days. Maximum inside temperature of the test pipe was 264° F. and the maximum outside temperature of the asphalt film was 138° F. At the end of the fourth day the insulated test pipe was disassembled and the coated insulation removed from the pipe and the asphalt surface coating examined carefully. No blisters or leaching of dissolved salts from the refractory cement through the coating was evident, although the refractory cement insulation was still very wet. The asphalt outer coating was found to be dry and flexible but still firm without signs of distortion due to vapor pressure forces.

*Test No. 2*

The same test pipe as described above was covered with the same refractory pipe insulating material and wetted as previously described prior to coating with an asphalt mastic material of the type frequently used for this purpose, comprising a cutback asphalt containing asbestos fiber and ground slate. Due to outside weather conditions at the time of the test, the coated pipe assembly was cured inside for 74 hours, and then cured for 24 hours outside. Steam was introduced for periods of 8 hours, and then for periods of 8½ hours on three successive days. The film of asphalt coating showed blistering after the first 4 hours of the test. The maximum inside temperature of the pipe was 310° F. and the maximum outside temperature of the coating was 156° F. The average maximum inside temperature was 260° F.

*Test No. 3*

The same pipe assembly as previously described was covered with the same type wet pipe insulating refractory cement material, and given a ⅛ inch coating of an asphalt emulsion of the type heretofore described, and which is extensively employed for this application. The coated pipe assembly was cured outdoors over a 2 day period. Even prior to the introduction of steam into the test pipe assembly, dissolved salts had leached out of the insulation through the asphalt emulsion and dried leaving a white stain on the outside surface of the asphalt coating. Steam was introduced into the test pipe for periods of 7½ hours and 8½ hours on 2 successive days. Maximum inside temperature was 260° F. and the maximum outside surface temperature of the coating was 116° F. After the subjection to these temperatures the staining of the asphalt coating was quite pronounced demonstrating that liquid water containing dissolved salts from the refractory cement had been wicked through the asphalt coating.

To further demonstrate the superiority of our improved composition over the asphalt coating materials of the prior art presently being employed, the following test was run to emphasize the greater permeability and flexibility of cured films prepared from our composition, where vapor pressure beneath the film is progressively built up.

*Apparatus and procedure.*—A brass cup approximately 3 inches in diameter x 2 inches deep, with a screw top and gasket assembly provided with a centered opening in the top, 1-⅞ inch diameter, was assembled with a cured membrane of our asphalt composition, ⅛ inch thick, used to close the 1-⅞ inch diameter opening. The cup was fitted with a Bourdon type test gauge (0–30 pounds, reading in ¼ pound subdivisions). The cup was filled with water to leave 50% by volume of air at the start of the test, and the top opening covered as described with a cured film of our asphalt composition, and placed in a water bath at 135° F., which was then heated on a hot plate. Increase of temperature within the cup caused pressure to develop because of expanding air, and increase in vapor pressure of the water. A record of time-temperature-pressure was made.

A similar test was run with a closure film obtained by curing a typical cold applied asphalt coating mastic used as one type of vapor seal, the cured film thickness again being ⅛ inch. This coating film had the composition of 15% fuller's earth, 75% asphalt, and 10% asbestos. Table I which follows, lists the test data for the test film comprised of our improved coating composition. Table II covers the test data for the film prepared from the asphalt mastic composition frequently used as a vapor barrier for insulation surfaces.

TABLE I

| Time, min. | Temperature, °F. | Gage Pressure, Lbs./sq. in. |
| --- | --- | --- |
| 2 | 135 | 1.50. |
| 4 | 136 | 1.75 (maximum). |
| 6 | 138 | 1.25. |
| 8 | 143 | 1.00. |
| 11 | 150 | 0.75. |
| 13 | 154 | 0.30. |
| 16 | 155 | 0.00. |
| 22 | 156 | 0.00. (Test discontinued.) |

Bubbles under the membrane began to form at about 0.75 lb. gage pressure. "Breathing" through the asphalt membrane occurred from approximately 20 different "holes" at various times throughout the test. Maximum deformation of film was 3/16 inches. No failure of membrane by cracking or severe deformation was noted under the conditions of the test.

TABLE II

| Time, min. | Temperature, °F. | Gage Pressure, Lbs./sq. in. |
|---|---|---|
| 10 | 145 | 2.75. |
| 13 | 150 | 3.10 (maximum). (Test discontinued.) |

Membrane burst around edge of restraining plate at 3.10 pounds per square inch pressure. No "breathing" action was noted prior to rupture of membrane, which indicated that film was not permeable to water vapor.

Maximum deformation of test membrane was 3/8 inch. Rupture occurred on under side of test membrane, with a crack being evident completely around circumference of the cup opening outlined by restraining ring.

The "breathing" action and stiffness of the membrane prepared from our improved composition permitted escape of gas to decrease the pressure before excessive deformation of the membrane occurred. The slight deformation observed with our membrane actually permitted the vapor transmission rate of the film to greatly increase, in addition to the normally high vapor transmission inherent in the coating, and the ability of the coating to increase its vapor transmission rate with increase in the vapor pressure is very important, and in effect acts as a safety valve for the cured film under extreme condition of high temperature and pressure as in this test.

The vapor seal type of coating membrane prepared from the mastic material did not develop openings to permit escape of gas until general failure had occurred at 3.10 pounds vapor pressure.

In formulating the coatings of this invention, sufficient solvent is added to the air-blown asphalt to give a final mixture which is either sprayable, brushable or trowelable, depending on the method of application to be used. Also, the type of solvent is selected to give the curing rate and flash point as desired.

The air-blown asphalt should have a softening point (R. & B.) of at least 170° F. where film temperatures reach 130° F. Higher softening points are preferred if the film temperature is expected to reach a value higher than this, thus being at least 200° F. for a film temperature of 170° F. Higher softening points are attained by adjusting the blowing time. The penetration at 77° F. of the air-blown asphalt should preferably be from 15–25 mm./10, and within the broad range of 10–30 mm./10; below 10 being too brittle and above 30 being too soft. There should be less than 60% (by volume) of asphalt in the cured film. By "cured" we refer to the coating after the solvent has evaporated and the film has become firm. Usually 24 hours is sufficient, but this will vary depending upon type and amount of cutback solvent used.

The asbestos fiber can be any of the 7M and/or 7T groups, the amount being varied, depending on the exact grade and source, as required to give the consistency and flow resistance desired of the coating material before curing. There should be from 7–15% (by volume) of asbestos in the cured film.

The expanded vermiculite should be of such size that only a trace is present on a No. 8 screen, not more than 10% on a No. 16 screen, and not less than 90% on a No. 100 screen. Bulk density of the vermiculite should be not higher than 20 lbs./cu. ft. There should be from 30–40% (by volume) of expanded vermiculite in the cured film.

Having described the invention and the manner and mode of practicing same, we claim:

1. An asphalt coating composition consisting essentially of in the uncured state from 40% to 60% by weight of an air-blown asphalt, from 30% to 40% by weight of a solvent for said asphalt, from 7% to 9% by weight expanded vermiculite of a size such that 90% is retained on a 100 mesh screen, from 13% to 21% by weight of short asbestos fiber, said air-blown asphalt having a penetration of from 10–30 mm./10 at 77° F. prior to incorporating said vermiculite and asbestos, a cured film of said composition being characterized by high permeability to water vapor and imperviousness to liquid water.

2. An asphalt coating composition consisting essentially of in the uncured state from 40% to 45% by weight of an air-blown asphalt base having a penetration of from 15–25 mm./10 at 77° F. and a softening point (R. & B.) of at least 170° F., 30% to 40% by weight of a solvent material for said asphalt comprising mineral spirits boiling below 450° F., from 7–9% of expanded vermiculite of a size such that a trace is retained by a #8 screen and at least 90% is retained by a #100 screen, and from 15% to 17% asbestos fibers selected from the group classified as 7M and 7T grades, said composition being characterized by imperviousness to liquid water, but having a water vapor transmission rate of from 0.1 to 0.3 gm. (1/8 inch film, 100 sq. inches, 24 hours at 0–50% relative humidity).

3. An asphaltic protective coating composition particularly adapted for application to surfaces likely to be subjected to elevated temperatures by means of a spray application consisting essentially of in the uncured state 41.0% by weight of an air-blown asphalt base, 36.5% by weight solvent naphtha boiling in the range of 306–360° F., 7.5% by weight expanded vermiculite, and 15.0% by weight asbestos fibers said composition being characterized by a flash point above 100 Pensky Martins Closed Cup) a (Stormer) viscosity at 77° F. of from 200–400, a cone penetration (77° F., mm./10) of from 340–370 and a weight of about 8 pounds per gallon at 60° F.

4. An asphaltic trowel grade protective coating composition particularly adapted for application to surfaces capable of retaining or transmitting liquid water consisting essentially of in the uncured state 42.5% by weight of an air-blown asphalt base, 32.0% solvent naphtha boiling in the range of 306–360° F., 8.5% by weight expanded vermiculite, and 17.0% by weight asbestos fibers, said composition being characterized by a flash point above 100 (Pensky Martens Closed Cup) a (Stormer) viscosity at 77° F., of from 200–400, a cone penetration (77° F., mm./10) of from 250–270, and a weight of about 8 pounds/gallon at 60° F.

References Cited in the file of this patent

UNITED STATES PATENTS

| | | |
|---|---|---|
| 2,214,904 | Johnson | Sept. 17, 1940 |
| 2,362,839 | Marc | Nov. 14, 1944 |
| 2,384,671 | Fratis | Sept. 11, 1945 |
| 2,400,563 | Marc | May 21, 1946 |
| 2,477,236 | Buchanan | July 26, 1949 |
| 2,511,830 | Fischer et al. | June 20, 1950 |
| 2,542,721 | Stafford | Feb. 20, 1951 |
| 2,569,399 | Burns et al. | Sept. 25, 1951 |
| 2,661,302 | Keith | Dec. 1, 1953 |